(No Model.)
W. W. LEFFINGWELL.
BARREL ROLLER.
No. 473,630. Patented Apr. 26, 1892.
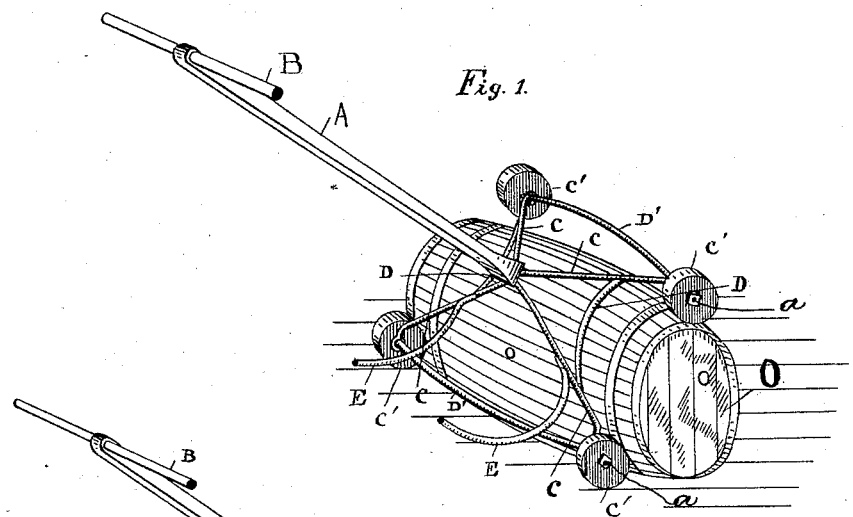
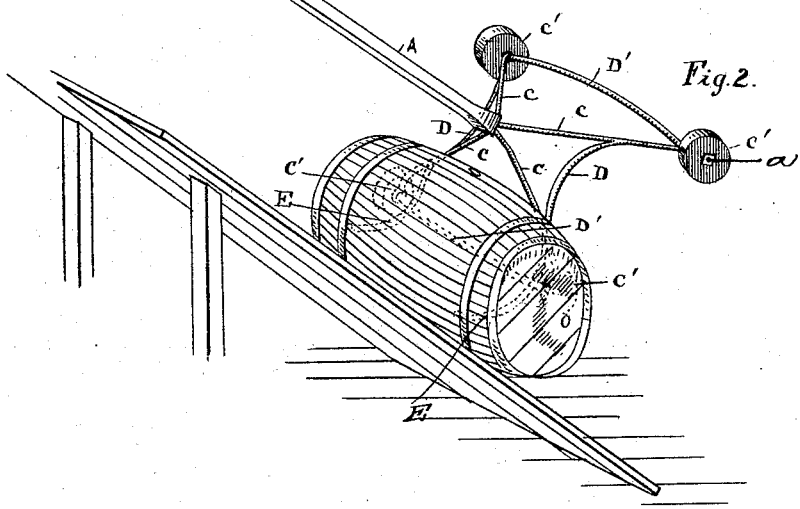
Witnesses —
A. Keithley.
F. J. O'Brien.
Inventor
William W. Leffingwell
By L. V. Tucker
atty.

UNITED STATES PATENT OFFICE.

WILLIAM WALTER LEFFINGWELL, OF DALTON CITY, ILLINOIS.

BARREL-ROLLER.

SPECIFICATION forming part of Letters Patent No. 473,630, dated April 26, 1892.

Application filed November 27, 1891. Serial No. 413,177. (No model.)

*To all whom it may concern:*

Be it known that I, WILLIAM WALTER LEFFINGWELL, a citizen of the United States, residing at Dalton City, in the county of Moultrie and State of Illinois, have invented certain new and useful Improvements in Barrel-Rollers; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in barrel-rollers for handling all kinds of barrels; and it consists in the construction and operation of parts, as hereinafter fully described, and especially set forth in the claim; and the objects are, first, to provide facilities for handling barrels with speed; second, the handling of barrels with safety, and, third, the handling of barrels with ease. I attain these objects by the mechanism illustrated in the accompanying drawings, in which—

Figure 1 is a plan view of barrel-roller as applied to a barrel while being rolled on a level or up an inclined plane. Fig. 2 is a view of barrel-roller as applied to a barrel while being rolled down an inclined plane.

A represents the handle of barrel-roller.

B represents the hand-piece of handle A of barrel-roller.

C represents the upcurved and upper parts and the downcurved and lower parts of barrel-roller frame, which are securely fastened to handle A by bolts or other suitable fastenings.

D represents the upcurved end braces, which are welded to the upper and lower end parts of barrel-roller frame C to keep them from spreading.

E represents curved hooks, which are welded to the lower end parts of barrel-roller frame C, which do not come in contact with the barrel while being rolled on a level or up an inclined plane.

D' represents the upper upcurved and lower downcurved axles of barrel-roller frame, which are securely held in place by having the outer ends of the upper and lower parts of barrel-frame C welded around them near the outer ends, forming a shoulder.

C' represents the wheels of barrel-roller, which revolve on axles D' between said shoulder and end, and are securely held in place by a nut $a$ on the extreme end of the said axle.

O indicates a barrel.

Any suitable material may be used in the construction of barrel-roller and may be varied in size.

What I claim, and desire to secure by Letters Patent of the United States, is—

The herein-described barrel-roller, the same comprising the handle A, the hand-piece B, the frame C, the frame-braces D, the curved hooks E, the axles D', and the wheels C', all substantially as set forth.

WILLIAM WALTER LEFFINGWELL.

Witnesses:
EBER R. LEFFINGWELL,
EUGENE S. TUCKER.